(12) United States Patent
Moritz et al.

(10) Patent No.: US 9,460,156 B2
(45) Date of Patent: Oct. 4, 2016

(54) MATCHING A FIRST LOCATION PROFILE WITH AT LEAST ONE OTHER LOCATION PROFILE

(75) Inventors: Simon Moritz, Stockholm (SE); Christoffer Davidsson, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 478 days.

(21) Appl. No.: 13/884,381

(22) PCT Filed: Nov. 11, 2011

(86) PCT No.: PCT/SE2011/051361
§ 371 (c)(1),
(2), (4) Date: May 9, 2013

(87) PCT Pub. No.: WO2012/064278
PCT Pub. Date: May 18, 2012

(65) Prior Publication Data
US 2013/0226937 A1   Aug. 29, 2013

Related U.S. Application Data

(60) Provisional application No. 61/413,005, filed on Nov. 12, 2010.

(51) Int. Cl.
G06F 17/30 (2006.01)
G06Q 30/02 (2012.01)

(52) U.S. Cl.
CPC ..... *G06F 17/30522* (2013.01); *G06F 17/3087* (2013.01); *G06Q 30/0282* (2013.01)

(58) Field of Classification Search
USPC ................. 707/758, 748, 743, 784
See application file for complete search history.

(56) References Cited

U.S. PATENT DOCUMENTS 7,873,616 B2 * 1/2011 Schickel-Zuber et al. ... 707/705
8,180,688 B1 * 5/2012 Velummylum .... G06Q 30/0201
705/26.1

(Continued)

FOREIGN PATENT DOCUMENTS

WO   2011053202 A1   5/2011

OTHER PUBLICATIONS

Davidsson, C., et al., "Utilizing Implicit Feedback and Context to Recommend Mobile Applications from First Use", CaRR 2011, Feb. 13, 2011, Stanford, CA, pp. 1-4.

(Continued)

*Primary Examiner* — Debbie Le
(74) *Attorney, Agent, or Firm* — Patents on Demand, P.A.; Brian K. Buchheit; Scott M. Garrett

(57) ABSTRACT

A server (3-2, 3-3) for supporting a recommendation (5) to a user device (1) is disclosed. The server comprises a matching unit (302) configured to match a first location profile associated with a current location ($1_r$) of the user device with at least one other location profile, wherein the matching is based on at least one item consumed in the current location in a first time interval ($\alpha$) and at least one item consumed in the other location in at least one second time interval (A1-A8, B1-B8, N1-Nn) which is different from the first time interval. A recommender system (3), a recommender engine computer program (91) and a computer program product (310) are also disclosed.

26 Claims, 11 Drawing Sheets

(56) References Cited

U.S. PATENT DOCUMENTS

| | | |
|---|---|---|
| 8,224,933 B2* | 7/2012 | Fikouras et al. ............... 709/221 |
| 8,442,976 B2* | 5/2013 | Diederiks et al. ............ 707/724 |
| 8,825,519 B2* | 9/2014 | Sun .............................. 705/14.1 |
| 8,832,258 B2* | 9/2014 | Griff ..................... H04W 24/10 |
| | | 370/252 |
| 2006/0266830 A1 | 11/2006 | Horozov et al. |
| 2007/0005419 A1* | 1/2007 | Horvitz et al. ................. 705/14 |
| 2008/0010272 A1* | 1/2008 | Schickel-Zuber et al. ....... 707/5 |
| 2009/0193099 A1 | 7/2009 | Partridge et al. |
| 2010/0280920 A1 | 11/2010 | Scott et al. |
| 2011/0282821 A1* | 11/2011 | Levy et al. ..................... 706/47 |
| 2012/0218202 A1* | 8/2012 | Sirpal et al. .................. 345/173 |

OTHER PUBLICATIONS

Davidsson, C., "Mobile Application Recommender System", Master Thesis, Dec. 2010, 60 pages.

Girardello, A. et al. "AppAware: Which Mobile Applications Are Hot?", Mobile HCI '10 Sep. 7-10, 2010, Lisboa, Portugal, pp. 431-434.

Chen, Y., et al., "A novel collaborative filtering approach for recommending ranked items", ScienceDirect, 2008 pp. 2396-2405.

\* cited by examiner

| LOCATION TABLE L-123 | | | |
|---|---|---|---|
| LOCATION ID 355 | ITEM ID 360 | TIME 365 | CONSUMPTION TYPE XXX |
| LOCATION 5 | I-123 | 2010-10-10 | Install |
| LOCATION 11 | I-123 | 2010-10-05 | Install |
| ● ● ● | | | |
| LOCATION 50 | I-42 | 2010-05-10 | Remove |
| LOCATION N | I-23 | 2010-05-05 | Watch |
| | | | |

Application Layer

Application Framework

Libraries                                              Android Run Time

Linux Kernel

MATCHING A FIRST LOCATION PROFILE WITH AT LEAST ONE OTHER LOCATION PROFILE

CROSS-REFERENCE TO RELATED APPLICATIONS

This application is a 35 U.S.C. §371 National Phase Entry Application from PCT/SE2011/051361, filed Nov. 11, 2011, and designating the United States, which claims priority to U.S. Provisional Patent Application No. 61/413,005, filed Nov. 12, 2010. The above-mentioned applications are incorporated by reference herein.

TECHNICAL FIELD

The invention relates to a recommender system, a server, a recommender engine computer program, and a computer program product for matching a first location profile with at least one other location profile.

BACKGROUND

Recommender systems are a relatively well-known technology today and used in different services for recommending, among other things, media items such as movies, music and pictures. Examples of such recommender systems are utilized by companies having Internet sites such as www.amazon.com and www.lastfm.com. Recommender systems help a user in finding interesting items without the user having to explicitly state what he or she wants.

A commonly used recommender method is CF (Collaborative Filtering) which produces recommendations by computing the similarity between users or items based on consumption history. CF systems suffer from the so-called 'new user problem', and in addition to this, they also suffer from the so-called 'new item problem'. The new user problem means that a user has to rate a sufficient number of items before the user's preferences can be understood. The new item problem causes new items to be ignored, i.e. not recommended, until a substantial number of users have rated the item. Another well-known recommender method is CB (Content Based) recommender systems. Simply said, CB recommendations are based on the description, meta data, about the content as such. From a user's profile in terms of item consumption, the user's preferences in terms of item attributes may be derived and used to find similar items to recommend. CB systems generally also suffer from the new user problem.

Combinations of the above methods are also common and referred to as HRS (Hybrid Recommender Systems). These hybrid systems can have four different architectures:
- implemented separately and combining predictions,
- incorporating some content-based characteristics into a CF algorithm,
- incorporating some CF characteristics into a CB algorithm, and
- a unified model which incorporates both CB and CF algorithms.

For more information see Y-L. Chen and L-C. Cheng: A novel collaborative filtering approach for recommending ranked items, Expert Syst. Appl., 34(4):2396-2405, 2008.

CA (Context Aware) recommender methods have emerged in the past years as the use of location-aware devices with various sensors have become more popular. Recommending applications for mobile devices has for instance been done by presenting which applications other users geographically close to the active user are consuming. This has been discussed in A. Girardello and F. Michahelles: AppAware: Which Mobile Applications Are Hot?, MobileHCI, 10 Sep. 7-10, 2010.

There are a number of different recommender systems entering the mobile device area making use of the location context of the device. Patent application US-2006/0266830-A1 discloses a method where location is used to enhance scaling of CF. The method requires that each location has a sufficient amount of consumption data for another recommender technique to produce good recommendations on the subset of all consumptions. Patent application US-2009/0193099-A1 discloses a system that assess a hypothetical context, such as current context, future times and future location, based on the context of each prior user request. The hypothetical context is then used to produce recommendations for the user. Recommendations are thus based on where a user has been as context and maps that to a neighborhood context. Hypothetical contexts here do however not make use of other data than what is known for the current user and the system does not capture any characteristic of the items to be recommended in relation to context.

The context-aware approach, using the context of the user requesting recommendations and the context of previous item consumptions in the system to produce recommendations introduce a new problem. To recommend, for example, items popular or frequently consumed in a certain location, such item data must already be present in the system and if a user is among the first to visit this location, there will be no or little data present.

SUMMARY

An object of the invention is to improve a recommender system, or rather recommendations to a user device/user, in that at least the above mentioned new problem is reduced.

The invention relates to a server for supporting a recommendation to a user device. The server comprises a matching unit configured to match a first location profile associated with a current location of the user device with at least one other location profile, wherein the matching is based on at least one item consumed in the current location in a first time interval and at least one item consumed in the other location in at least one second time interval which is different from the first time interval ($\alpha$). Hereby is enabled that a recommendation may be based on consumed items not only in the current location at a certain period of time, but also on consumed items in other locations which have a similar, but time-shifted consumption pattern. When similarity between locations is detected, it may not be based on the complete location profile, but rather based on the similarity of the locations at specific points in time.

An item is or may correspond to a variety of things, such as, for example, a book, a movie, music, an e-book, a computer program (e.g. an application for a mobile phone, a web-browser application, a computer program for a PC, and a tablet/slate application), a consumer product (e.g., an appliance, clothes, a car, etc.), a service (e.g., professional services, such as a service provided by a doctor and a lawyer), an event (such as a music concert, an exhibition, a sports event), a restaurant, a café, a bar, a nightclub, a shop, a shopping centre, a sports arena, a holiday resort, a hotel, a petrol station, an ATM (Automated Teller Machine), a thing worth seeing etc.

A consumption of an item is a performed action associated with the item. According to this definition, consumption can be an "implicit" action by a user or the user device or an explicit action, examples of which are mentioned in the detailed description.

A location profile is a set of data comprising a location identity, at least one item identity, at least one consumption associated with the item identity and the location identity and a time associated with each consumption. The type of consumption may also be comprised in the location profile and other information associated with the consumption, the item identity and the location identity may also be comprised in the location profile. Such optional, further information may be sensor identity, operating system of the user device, and more specific location data, such as the geographical co-ordinates longitude, latitude and altitude associated with the consumption.

The first time interval may end after the end of the second time interval and/or begin after the beginning of the second time interval. The first time interval may also have occurred later than the second time interval, i.e there are no overlap between the time intervals, so that compared location profiles do not have any consumption in the same period of time. Hereby the possibility of capturing the trends in item popularity and changing consumption patterns over time in different locations. The detection of similar locations enables a recommender system to capture a greater fraction of the available dataset. This means that the server may be able to find location neighborhood over time, which will be an important component for a recommender system when a user have not consumed anything on his user device, i.e the recommender system is enabled to match consumptions there and then with consumptions here and now.

The matching unit may be configured to perform the matching by comparing hashed consumption information of the first location profile with hashed consumption information of the other location profile. Alternatively, the matching unit may be configured to perform the matching partly by calculating a similarity between items and in that case the matching unit may be configured to calculating the similarity using a Pearson-r correlation.

The server may comprise a weighting unit for basing the recommendation also on a weighted prioritization between items associated with the first location profile and items of the other location profile.

The server may comprise a sending unit for sending the recommendation, wherein the recommendation comprises information about items retrieved both from the first location profile and from the other location profile.

The matching unit may be a part of a recommender engine.

The server may comprise a retrieving unit and a database, which comprises a first set of items associated with the first location profile and a second set of items associated with the other location profile. The retrieving unit is in this case configured to retrieve the first set of items and the second set of items.

The first set of items and the second set of items may be retrievable from a table of the database, where the table comprises records where each record comprises location identity, item identity, time of consumption and consumption type.

The server may comprise an information enricher for retrieving from a meta data database further information associated with items recommended in the recommendation. The server may also comprise the meta data database.

The server may comprise a receiving unit configured to receive from the user device a user identification and a geographical position associated with the user identification.

The user identification may be one or more of user device identity, IMSI, mobile network subscription identity, and authentication data.

The receiving unit may also be adapted to receive, from the user device, information about at least one consumption of an item and a time of the consumption.

The receiving unit may be configured to receive from the user device information about a wireless telecommunications network utilized by the user device, user password for a service, operating system of the user device, and information on whether the subscription is a post-paid or prepaid subscription.

The invention also relates to a recommender system comprising a first server and a second server. The first server comprises a sending unit for sending a recommendation of at least one item to a user device. The second server comprises a matching unit configured to match a first location profile associated with a current location of the user device with at least one other location profile, wherein the matching is based on at least one item consumed in the current location in a first time interval and at least one item consumed in the other location in at least one second time interval which is different from the first time interval.

The second server may comprise a weighting unit for basing the recommendation also on a weighted prioritization between items associated with the first location profile and items of the other location profile.

The second server may comprise a retrieving unit and a database, which comprises a first set of items associated with the first location profile and a second set of items associated with the other location profile, and wherein the retrieving unit is configured to retrieve the first set of items and the second set of items.

The first server may comprise an information enricher for retrieving from a meta data database further information associated with items recommended in the recommendation.

Furthermore the invention relates to a recommender engine computer program which comprises computer readable code means which when run on a server of a recommender system causes the server to match a first location profile associated with a current location of the user device with at least one other location profile, wherein the matching is based on at least one item consumed in the current location in a first time interval and at least one item consumed in the other location in at least one second time interval which is different from the first time interval.

The recommender engine computer program may comprise computer readable code means which when run on the server causes the server to perform the matching by comparing hashed consumption information of the first location profile with hashed consumption information of the second location profile.

The recommender engine computer program may comprise computer readable code means which when run on the server causes the server to perform the matching partly by calculating a similarity between items.

The recommender engine computer program may comprise computer readable code means which when run on the server causes the server to retrieve from a database a first set of items associated with the first location profile and a second set of items associated with the other location profile.

Moreover the invention relates to a computer program product, which comprises a computer readable medium and the recommender engine computer program stored on the computer readable medium.

BRIEF DESCRIPTION OF THE DRAWINGS

The objects, advantages and effects as well as features of the invention will be more readily understood from the following detailed description of embodiments of a user device, recommender system, servers, computer program and computer program products when read together with the accompanying drawings, in which.

DETAILED DESCRIPTION

Figure 1:
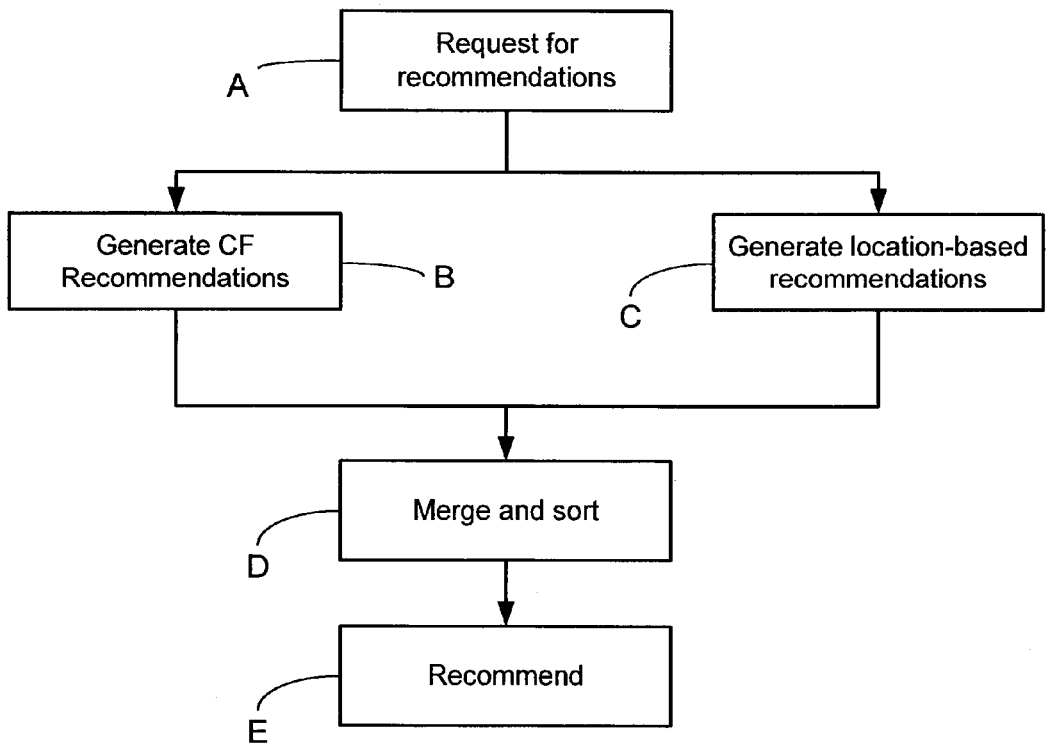
FIG. 1 is an overview flowchart of an embodiment of a recommendation method performed by a recommender system.

The inventors have acknowledged that a characteristic of items which is not captured by most recommender systems is the time and context bound popularity of the item. For example, an item may be a good recommendation at one time in one location, but bad at a different time at a different location. This characteristic can be seen as a trend, but may be the result of release dates of items or other events which cannot be foreseen by the recommender system. A documentary about elections may for instance be at its peak of relevance in the period of time leading up to an election in a region. Elections are however not held at the same point in time globally, and thus, the relevance of the documentary will be associated with time and place. Another example is that a trend, such as a fashion trend, which first pops up in New York may propagate over the world and half a year later occur in, for example, Stockholm. This acknowledgement has been utilized in embodiments of this invention to solve the above mentioned new problem by making use of the location of the user's user device to find other similar locations in terms of item consumption. These similar locations are detected and popular items at these locations may be recommended instead of or in addition to popular items in the current location of the user device. The detection of similar locations enables a recommender system to capture a greater fraction of the available dataset. In essence this means that at least some embodiments disclosed herein enables a recommender system to find location neighborhood over time, which alleviate only the new problem, but also the above mentioned new user problem when the user has not consumed anything on the user device, i.e. the recommender system according to some embodiments is enabled to match consumptions 'there and then' with consumptions 'here and now'.

Another example benefiting from the invention is when a popular musician releases a new album in New York and it generates a certain behavior there and then. A few weeks/month later the album came to Stockholm and generated a similar pattern. Here it would be possible to match consumption profiles over time. Stockholm and New York could in other words be described as having similar content profiles in music but be time-shifted.

Yet another example is the Disneyland use case. A user is among the first users of the recommender system to visit Disneyland in California, USA. However, a lot of users already used the recommender system at Disneyland in Paris, France. Since the previous few to visit Disneyland California consumed similar items (e.g. Disney history application, kids games, communication application, Google Maps) to the ones who have visited Disneyland Paris, these locations are detected as similar and items consumed at Disneyland Paris are valid as recommendations for the California counterpart.

While the recommender system described herein, as well as servers, methods, computer programs and computer program products, covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

FIG. 1 shows an overview flowchart of a recommendation process to serve as an example of where location-based recommendations could be produced. In a step A, a user device 1/user equipment (see FIG. 2) sends a request for recommendations/recommendation request 2 to a recommender system 3 via an access network 4 and possibly also a web-server (not shown). The web-server may be a part of a server which communicates with a server of the recommender system 3, but the web-server software may also be a part of a server (server host) which also is at least a part of the recommender system 3. The access network 4 may comprise one or more wired and/or wireless networks, e.g. E-UTRAN (Evolved Universal Terrestrial Radio Access Network). The recommendation request 2 is received by the recommender system 3. In a step B a server of the recommender system 3 generates a recommendation, or rather an intermediate recommendation, based on a CF method, which could be any method known to the skilled person. The CF-method is not as such considered to be at the core of the invention. A server of the recommender system 3 generates a location-based recommendation/prediction in step C and this will be described more in detail below in conjunction with FIG. 4. In a step D a server of the recommender system 3 gather and merge the recommendation from step B and the location-based recommendation of step C. Recommendations of items may here be sorted according to their likelihood of being relevant as recommendations according to e.g. a weighting method described below under the heading "Local vs. Global popularity". In a step E the recommender system 3 sends a final recommendation 5/recommendation response to the user device 1. The recommendation 5 may thus contain information associated with consumed items in another geographical area/neighborhood area. The recommendation 5 sent to the user device 1 may not only comprise an indication of the recommended items themselves, but also additional information, enriching the information given about at least one of the items, such as images, links to further information, price etc. associated with the recommended items. Such enriching information may be already stored in the recommender system 3 by previously having at least indirectly received in the form of meta data by the recommender system from third parties databases, such as external databases 6 of network operators (see FIG. 3) and web shops, but may already be stored in the recommender system 3. Another option is to fetch the meta data on an ad-hoc basis from the external databases 6, but this slows down the time for recommendation and also decreases the possibility of an optional CB-based recommender functionality.

Figure 2:
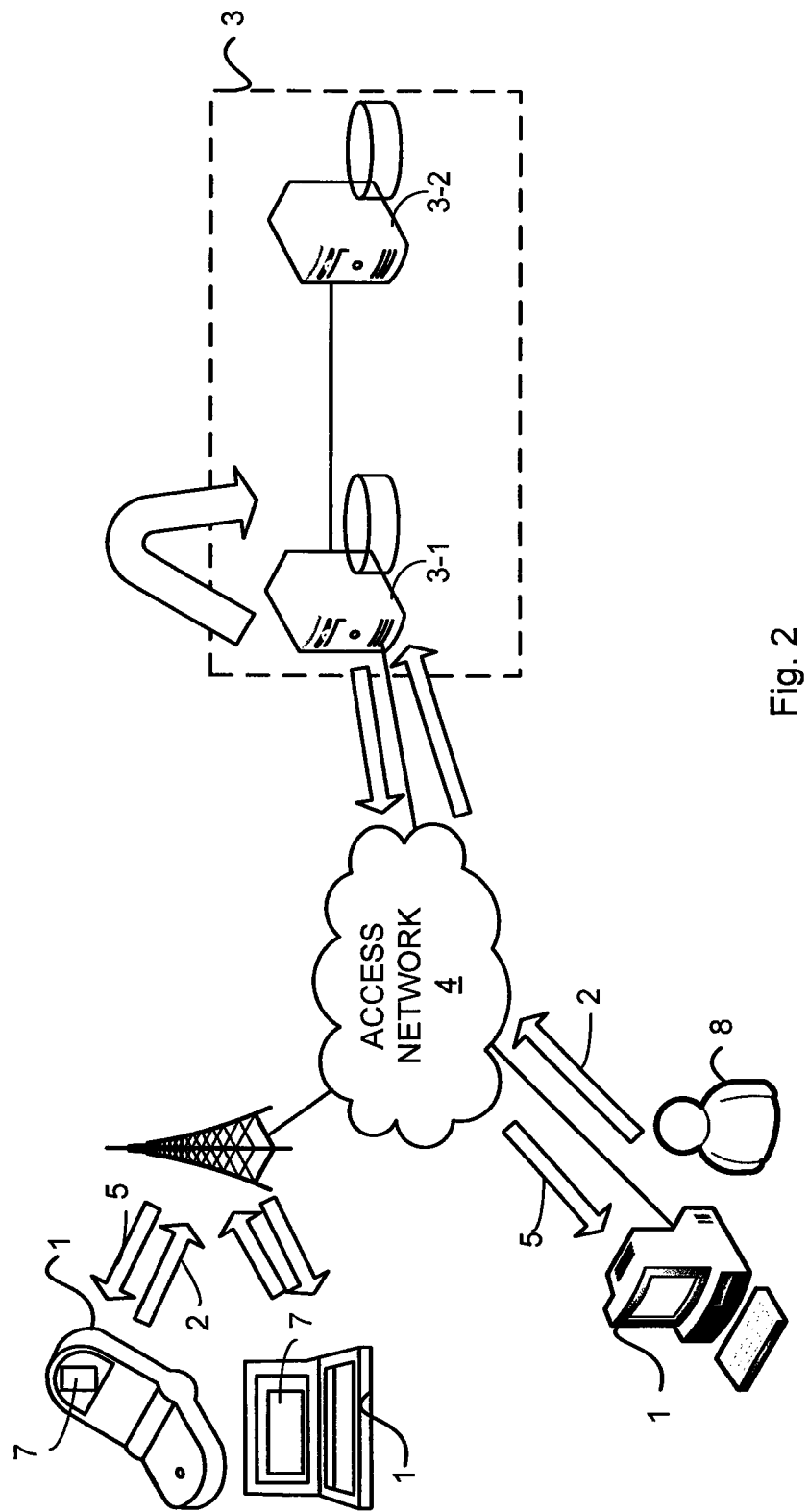
FIG. 2 illustrates an embodiment of a recommender system and examples of user devices.
Figures 3, 8:
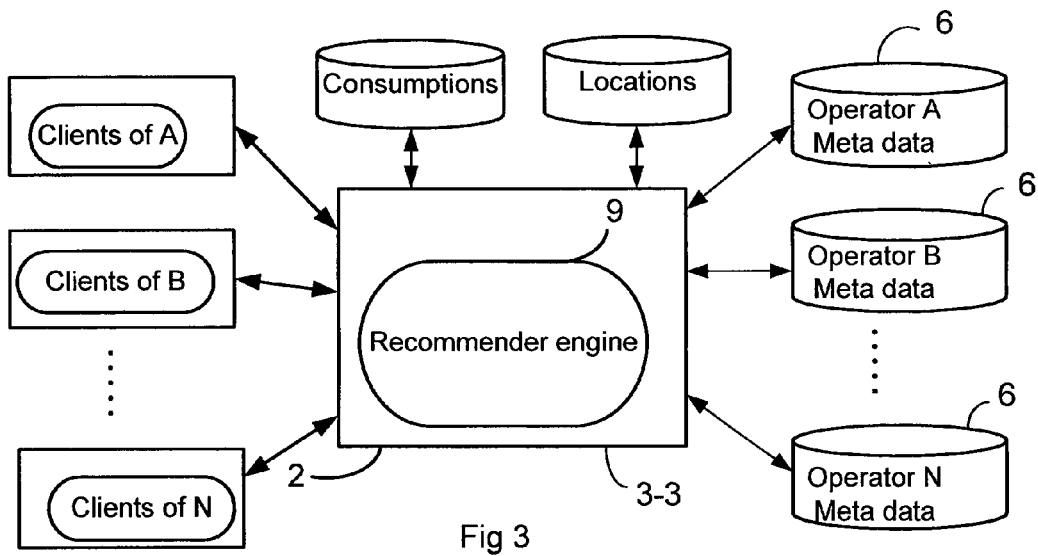
FIG. 3 illustrates a server comprising a recommender engine and meta data interfaces with network operators.
FIG. 8 illustrates an example of a database table from which to build location profiles.

The user device 1 is in FIG. 2 illustrated as a desktop computer or a mobile station in the form of a laptop or a wireless telephone, but could of course be another type of user device, e.g. a wireless tablet/slate, an IP TV system, a vehicle navigation system detachable from a vehicle, and a multimedia unit embedded in a vehicle. A client application 7 in the form of either a laptop application or a mobile application is also illustrated to show that in this embodiment there is a client application which communicates with the recommender system 3. In FIG. 2 the recommender system 3 is illustrated with a first server 3-1 and a second server 3-2, and in such a configuration the first server 3-1 in one embodiment is the one that performs at least the receiving of the recommendation request 2 in steps A and step E, including the enrichment of item information to the recommendation 5 sent to the user device 1. Accordingly, the second server 3-2 may be the one that performs step B, C and D. However, the person ordinary skilled in the art understand that the recommender system 3 may comprise only one server 3-3/server host as illustrated in FIG. 3 or more than two servers, for example one server for each one of the steps A-E. A user 8 is also illustrated in FIG. 2 in order to distinguish it as a person and not the user device 1. FIG. 3 also illustrates a recommender engine 9 which when run by the server of FIG. 3 causes the server to perform at least steps B-D.

Although FIG. 2 shows a recommendation request 2 from the user device 1, there are alternative embodiments where the recommender system 3 is utilized to select and push recommendations to users of a recommendation service without the user devices specifically having to send the recommendation request.

Figure 4:
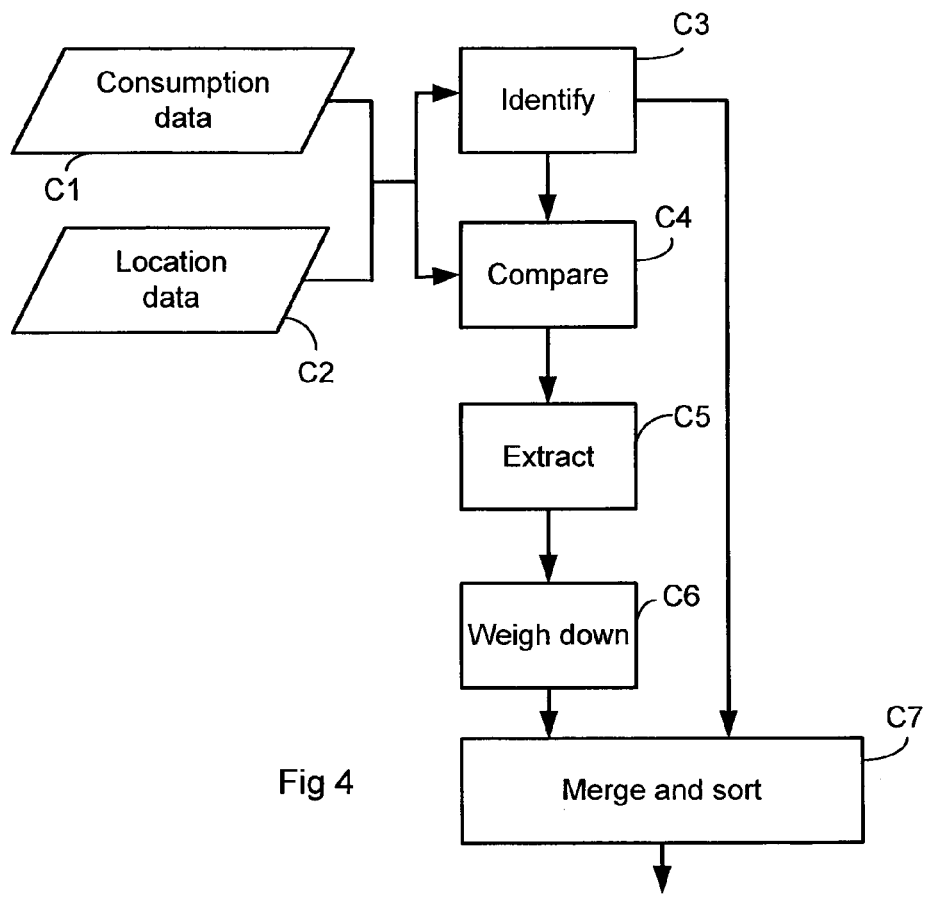
FIG. 4 is a flowchart illustrating steps according to an embodiment of a step of the embodiment of FIG. 1.

Now turning to FIG. 4, wherein steps C1 and C2 indicate that the recommender system 3 according to one embodiment retrieves data about consumptions, locations and relations between the consumption and location, i.e. a so-called consumption-location relation or consumption-location association. How this can be done is described more in detail further down in conjunction with the description of a specific embodiment. A consumption is here defined as a performed action associated with the item. According to this definition, consumption can be an "implicit" action by the user 8 or the user device 1, such as actions mentioned in table 1 below related to an item in the form of a mobile phone application, in the table abbreviated to 'app'.

TABLE 1

Consumption types and their meaning

| Type of consumption | Meaning |
|---|---|
| Consumed | The user has run the app for (value) milliseconds |
| Save | The user has installed the app |
| Glimpse | The app has been shown on a screen in a list of recommendations to the user |
| Consider | The user has viewed the details of an app, i.e. the details of the app has been displayed on the screen of the mobile phone |
| Mark | The user has placed the app in a list, such as in a favorite list |
| Associate | The app has been returned as a recommendation to the user (but was not necessarily display on screen) |
| Query | The user has requested apps similar to the app |
| Delete | The user has uninstalled the app |

A consumption can also be an explicit action initiated by the user 8, e.g. rating the item on a scale such as a five-star scale, and pushing a button for "like" or "dislike".

A location can be any geographical area identified by an identification (id). The identification is in one embodiment a string of characters or a number. For instance, streets, cities and countries can be assigned unique id:s for the recommender system 3 and also be stored within the recommender system 3. A consumption of an item can thus be associated with more than one location in different location layers, e.g. a consumption in a particular part of Stockholm could be associated with a location for Europe, a location for the European Union, a location for Scandinavia, a location for Sweden, a location for the part of Sweden where Stockholm is situated, a location for the Stockholm area and a location for a particular part of the Stockholm area. One way of associating geographical areas with locations is to dedicate each postcode/zip code area with a location-id. Another way of defining a location area with a particular location-id is to define its location as the geographical area within a circle, rectangle or polygon with a predetermined center and a predetermined radius. Another alternative is to not only define a circular location with a fixed radius, but to make the radius adaptive/expandable in order to make sure that each location can be associated with a certain number of items, if that is considered to be beneficial to the recommender system 3 in some embodiments. This allows, for example, locations in the same location layer to cover smaller geographical areas in cities and larger geographical areas in rural areas. In some embodiments a geographical position in the form of e.g. longitude and latitude or an IP-address, does not necessarily have to be associated with only one location-id in even the same location layer, but could belong to more than one location-id, for instance if two circular locations overlap each other.

A consumption is associated with an item, a user, a context (comprising location and time) mappable to the locations stored in the recommender system 3, e.g. in the first server 3-1 or the second server 3-2, and a consumption type identifying the observed user action/user device action, such as one of the consumptions mentioned in table 1. Different consumptions can also be given different weights, for example, an application with consumption type 'Save' can be given a relative weight of 10, whereas Consumed is given five, and Mark and Query are given one respectively. In one embodiment this means that information related to consumption is stored in a database in the user device 1 and is sent to the recommender system 3 at either regular intervals or more arbitrarily, such as when manually requested or when opening the client application 7. In other words there are no location profiles stored in the user device 1 in this embodiment. Instead location profiles are here only stored in the recommender system 3 and the data in each location profile is generated through consumption information received from not only one user device 1, but preferably from a plurality of user devices. In the recommender system 3, locations and consumptions serve as input to the location-based recommender part of the recommender system 3, along with the location of the recommendation request 2, i.e. the location $l_r$ of the user or user device 1. From this data, popular items at location $l_r$ can be identified in a step C3 and be used as location $l_r$'s profile to serve as input to a step C 4 and a step C7 where location $l_r$'s profile is used to identify similar locations and to provide recommendable items, respectively. In other words, step C3 may be set to identify top-consumed items and a location profile.

In a step C4, one or more locations $L_s$ similar to location $l_r$ are identified, e.g. by comparing other locations over time windows using CF-like neighborhood identification. The identification is described more in detail below under the sub-heading 'Identifying Time-shifted Location Similarities'. The most popular items, so-called top items, at these locations are then extracted in step C5 and their predicted rank weighted down in step C6 to account for the time that has passed since the consumption. This could be performed by a rating decay as described in the patent application WO-2011/005157-A1. That application describes the decay of item ratings according to eq. 1 below.

$$N(t) = (N_0 - \overline{R})e^{-\frac{ln2}{t_{1/2}}t} + \overline{R}$$ [math eq. 1]

In the equation, $N_0$ is the actual rating value and $\overline{R}$ is the average rating that the actual rating will decay towards. The actual rating values decay with a pre-specified half-life. In [eq. 1] this half-life is t½. N(t) is the new rating value at time t.

In a step C7, the items recommended from location $l_r$ and $L_s$ are merged by weighting the predicted ranks of items together. This could be performed using a simple weighting function such as the one of math eq. 2 below.

$$\overline{r}_i(r_{Lsi},r_{lri}) = \omega_{Ls} \cdot r_{Lsi} + \omega_{lr} \cdot r_{lri}$$ [math eq. 2]

where $\omega_{Ls} + \omega_{lr} = 1$, $\overline{r}_i$ is the new rank of item i, $r_{Lsi}$ is the rank of item i base on $L_s$ and $r_{lri}$ is the rank of item i based on location $l_r$.

Identifying Time-shifted Location Similarities

Figure 5:
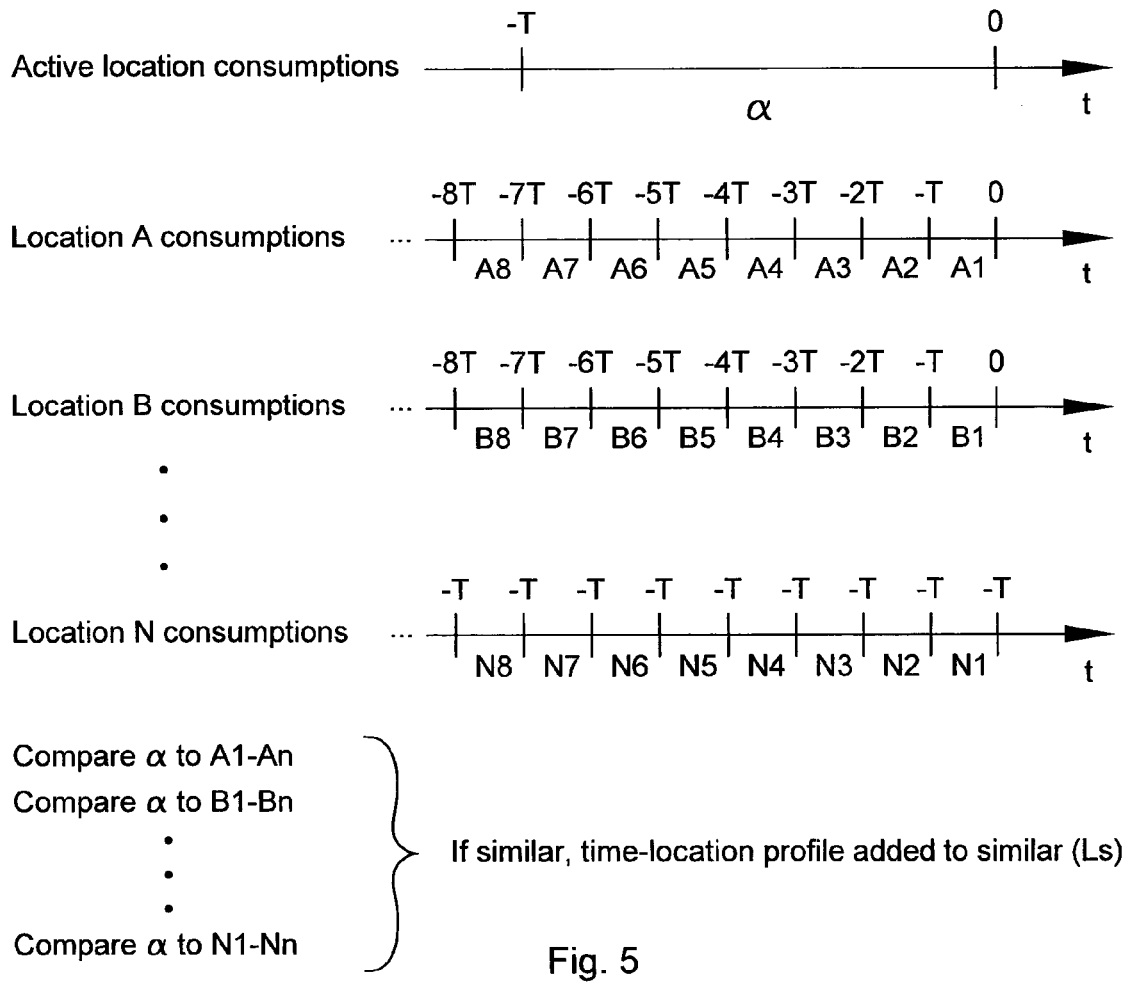
FIG. 5 illustrates how location profiles may be transformed to time-location profiles.
Figure 7:
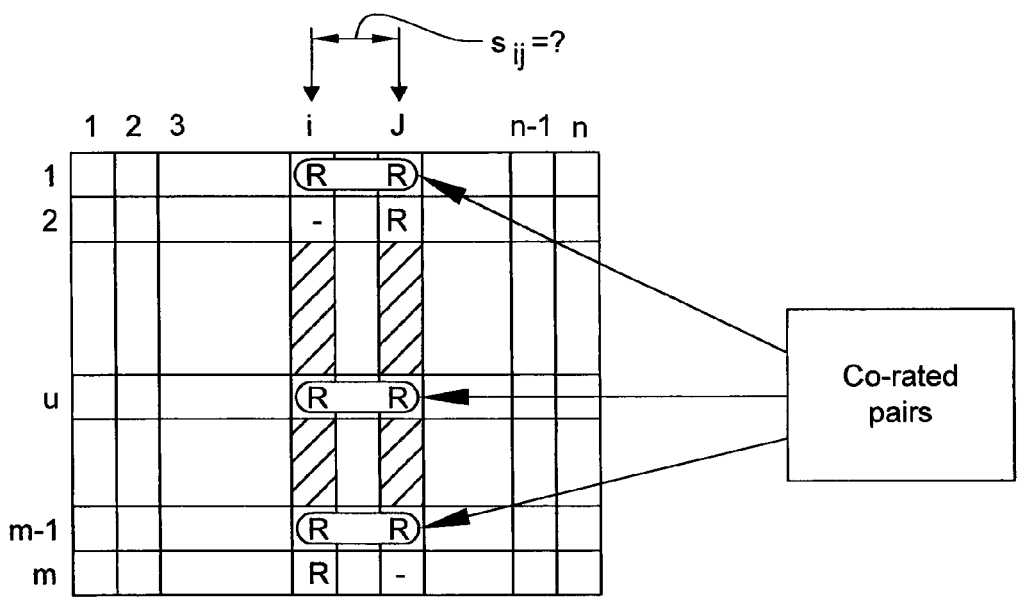
FIG. 7 shows an example of co-rating of item pairs.
Figure 6:
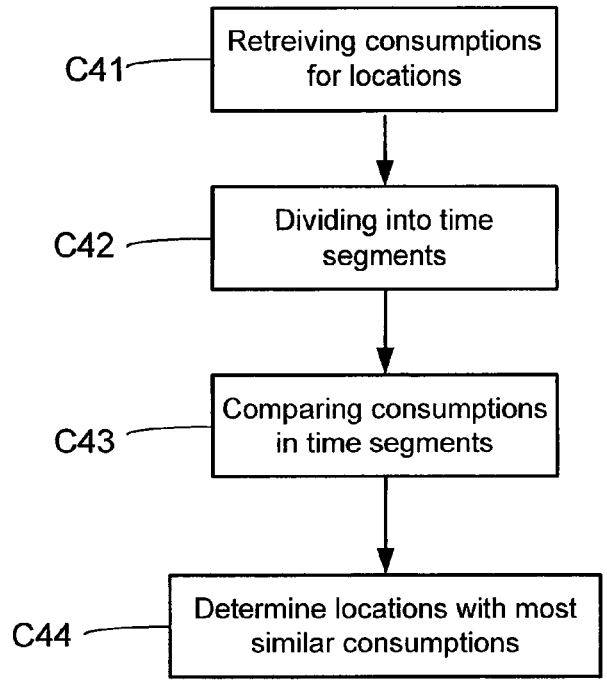
FIG. 6 is a flowchart for embodiments describing different ways of comparing location profiles.

FIGS. 5 and 6 illustrate how location profiles can be transformed to time-location profiles (or location sub-profiles) by retrieving consumptions for current and other locations shown as step C41 and as shown as C 42 by dividing the consumptions for each location into segments over time, i.e. time segments. Further, in step C43, a time-location profile for location $l_r$ is compared to such time-location profiles and similar time-locations are identified. One example of how this similarity identification could be implemented is by hashing the consumption information from a first time interval a and compare the hashed consumption information with hashed consumption information from second time intervals A1-A8 of a location A, time intervals B1-B8 of a location B, . . . time intervals N1-Nn of location N respectively. Another example of how the similarity identification can be implemented is by using a neighborhood algorithm where different location profiles are matched by, for example, calculating the similarity $S_{ij}$ between two items i and j, for example by utilizing a Pearson-r correlation con i,j. To make the correlation computationally accurate, the co-rated cases, i.e. cases where the users rated both i and j, are first isolated/identified as shown in FIG. 7. In the example of FIG. 7 each co-rated pairs are obtained from different users which in FIG. 7 are called "1", "u" and "m-1". Observe that the neighborhood algorithm is not intended to find locations that geographically are close to each other, but to find locations that are associated with similar consumptions, even though the consumptions do not have to be similar at the same time interval. Thus, here the neighborhood algorithm checks the similarity of the location profile for the time interval α for the location where the user device is positioned with all location profiles of A-N associated with the time intervals A1-A8, B1-B8, . . . N1-Nn respectively. In other words, item-item similarity is computed by looking into co-rated items only and a similarity $S_{ij}$ is computed by looking into items i and j. The neighborhood algorithm then causes the recommender system 3 to decide which location profiles that are closest to the location profile associated with the first time interval α. The determining either with the help of the neighborhood algorithm or with a hashing function is illustrated as step C44. A predetermined number, for example 10, of the most relevant location profiles can be determined with the help of the neighborhood algorithm.

The steps C41-C44 are in one embodiment performed by the recommender engine 9, but step C41 may in another embodiment be performed by a part of the recommender system 3 which is not considered to be a part of the recommender engine 9. More specifically, the recommender engine 9 here comprises a matching unit 302 (see FIG. 10) for matching location profiles in a way corresponding to steps C43-C44. The matching unit 302 may however in other embodiments be enabled with the help of a separate matching engine computer program 307 (see FIG. 11) which interacts with the recommender engine 9. The recommender engine 9 may of course also comprise the hashing function in embodiments where the matching is done by comparing hashed consumption information. The skilled person also knows that there exist other alternatives to the two above matching principles. One alternative is to calculate the similarity between vectors comprising data of the location profiles. A cosine similarity can be calculated and two vectors/location profiles may be determined to be similar if the angle between them is equal or smaller than a threshold angle. The angle could also be measured in a reduced number of dimensions using PCA (Principle Component Analysis) if the number of dimensions of the vectors is considered as too large. Yet another alternative is to use clustering algorithms with classifiers to determine clusters, for example to cluster different consumptions and determine the similarity of clusters associated with location profiles.

It must also be mentioned that the compared time-location profiles may have an equal length of time even though they are time-shifted, but this is not necessary at all. Similarities can be identified without the need for time-location profiles of an equal time length. The first time interval α may be longer than each one of the other time intervals to which it is compared, but may also be shorter in time than the other time intervals. It should also be mentioned that it in some embodiments might not be necessary to divide one or more of the location profiles which shall be compared, so the step C42 is as an optional step with respect to comparison of sub-parts of location profiles, since it according to the invention is possible to compare complete location profiles as long as there are different times of either one or both of the first and last consumptions of the current location profile and a location profile with which it shall be compared. The selection of time intervals when segmenting consumptions in a location profile can be made in many different ways. Simple examples are to just to set the time intervals as one for each day, one for each morning, one for each evening, one for typical rush-hours etc. It could also be interesting to check variations in years, by comparing location profiles from a specific date each year, i.e. comparing Christmas Eve in one location with Christmas Eve in another location one year ago. Trends, such as after-work trends, can also be analyzed by matching different Fridays with each other.

FIG. 8 illustrates an example of a location table stored in a database 305 (see FIG. 10) of the recommender system 3. The database may be e.g. an SQL database or, for improved scalability, an HDFS (Hadoop Distributed File System). The location table here comprises the columns: location ID, item ID, time and consumption type. In other words the table comprises data associated with location id:s and is here an aggregation of more than one location profile. The time has here been illustrated with dates, but it is evident that a more specific time/time stamp, i.e hours, minutes and seconds etc, could also be comprised in the time column or in a second time column. In the case where a table like the one illustrated in FIG. 8 is used, a location profile can be retrieved by, for example, running an SQL query. For a location profile with the location ID=11, the SQL query typically is a SQL SELECT Statement:

SELECT*FROM location$_{13}$table WHERE locationID=11

The returned answer would then be all item id:s, times and consumption types associated with the location 11 in the location table.

By making use of the location of the user device 1, it should be possible to produce better than random recommendations for new users. Through identification of locations with similar consumption patterns, a greater fraction of the total set of items is made recommendable and locations with insufficient profiles would be able to produce recommendations, i.e. a user that just has bought, for example, a new android phone can still get interesting and good recommendation from the first day, if such methods are incorporated in the mobile phone and/or in an application providing such functionality. Embodiments specifically directed to recommendation of mobile applications are described more in detail further down.

As locations are compared within time intervals, a serendipity effect may be obtained. That is, if a first location $l_1$ is detected as similar to a second location $l_2$ of n days ago, recommending items currently popular at the second location $l_2$ could be seen as a prediction of the future of consumption in the first location $l_1$. The time shifted property of the identification of similar locations also lets the recommender system 3 capture trends in item consumption, i.e. identifying and recommending items associated with contexts which are not limited to the current context of the current location of the user device 1.

There are currently not enough good methods that aid users in finding interesting recommendations on a device that does not have a consumption history. The invention herein is describing a new way of using location and time sliding to perform good recommendations.

Local vs. Global Popularity

In order to have separable location profiles, items which are globally popular may in an embodiment deliberately not be included in the profile as such items will only contribute to an increased similarity between all locations. The location profiles should rather be made up of items truly characterizing the location. Just as a human being is not necessarily well-defined by someone having two arms, two legs and one nose, since it matches most people, certain general location attributes are not enough to accurately describe a certain location. Techniques to identify such globally and locally popular items are described in WO-2011/053292-A1 and can be used to generate location profiles in steps C3 and C4 of FIG. 4.

Figure 9:
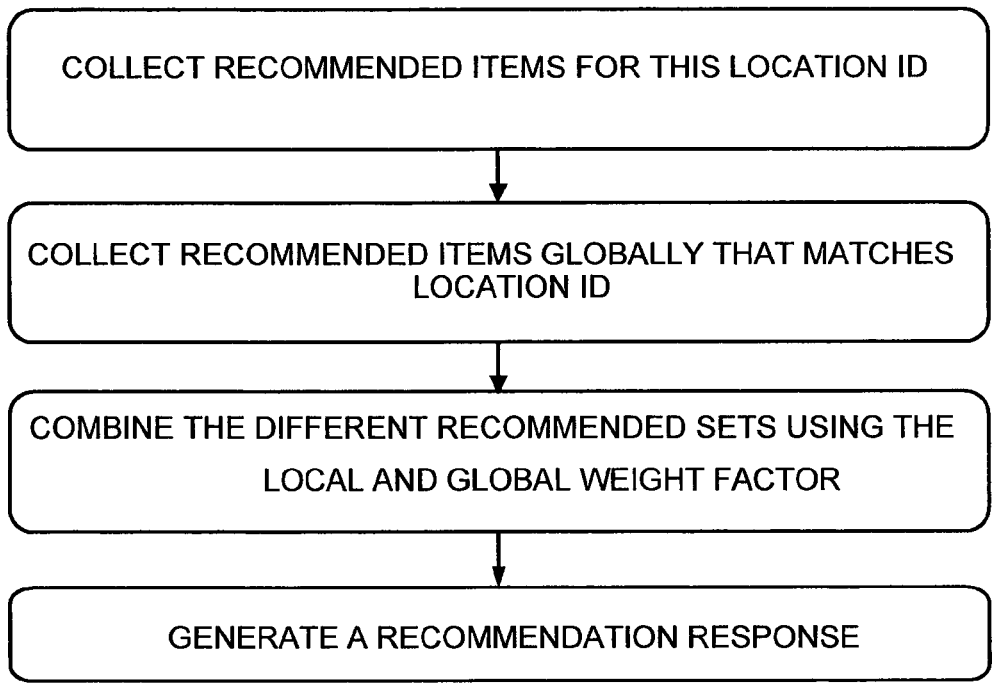
FIG. 9 is a flowchart illustrating steps according to an embodiment where further ranking is made based on the location of items, FIG. 10 schematically shows an embodiment of a server of a recommender system, FIG. 11 schematically shows an embodiment of a server of a recommender system, FIG. 12 schematically shows an embodiment of a server of a recommender system, FIG. 13 schematically shows an embodiment of a server of a recommender system.

As illustrated in FIG. 9, further ranking of items in and the similar/neighboring locations may be made by calculating and taking into account a global weighting factor (GWF) for all locations being determined as similar to the location $l_r$, and in some embodiments also a local weighting factor (LWF) for items in the location profile of location $l_r$. A 'local' list of recommended items in the location profile of location $l_r$ and a 'global' list of consumed items from the similar places is retrieved. The recommended items to be sent in the recommendation 5 are then calculated using the GWF applied on the items of the similar locations and LWF applied on the items in the location profile of location $l_r$. In other words the recommender system 3 can be modified so that the weighting could be different in dependence on how important it is to send a recommendation of items consumed at location $l_r$ and how important it is to see items consumed in the neighboring/similar locations.

Figure 10:
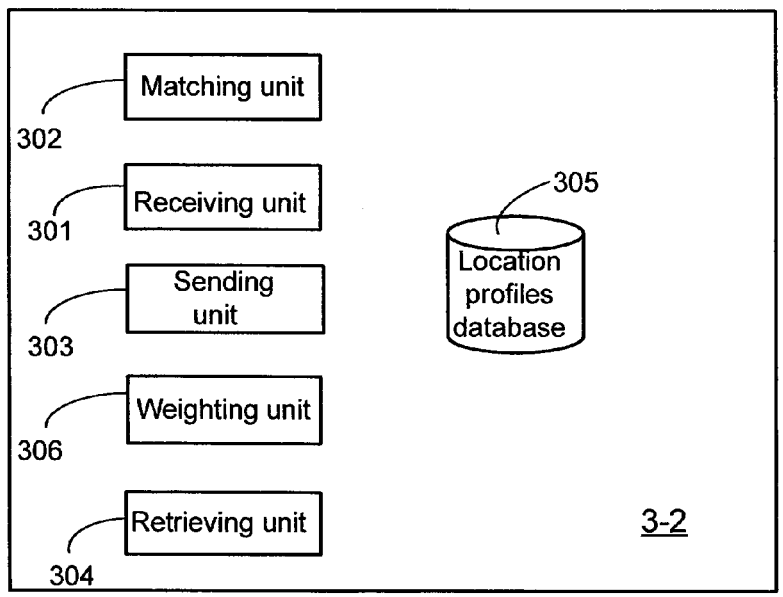

Having described the functions of different embodiments of the recommender system 3, a server in the form of the second server 3-2 shall now be described in conjunction with FIG. 10. The server thus supports recommendation to the user device 1 and comprises a receiving unit 301 for receiving a forwarded or modified recommendation request from the first server 3-1. The second server also comprises the matching unit 302 for matching the location profile for location $l_r$ with at least one other location profile, wherein the matching is based on items consumed in the first location in a first time interval and items consumed in the other location in a second time interval. The second server 3-2 also comprises a sending unit 303 for sending a set of recommended items to another server, such as the first server 3-1. The second server 3-2 also comprises a retrieving unit 304 for retrieving a first set of items associated with the location profile for location $l_r$ and a second set of items associated with at least one other location profile from a database 305, which in FIG. 10 is comprised in the second server 3-2, but which of course could be in another server of the recommender system 3. The second server 3-2 here also comprises an optional weighting unit 306 which configure the second server 3-2 to base its recommendation to the user device 1 based on a weighted prioritization between items associated with the first location profile and the other location profile according to what has been described above.

Although the respective unit disclosed in conjunction with FIG. 10 have been disclosed as physically separate units in the second server 3-2, and all may be special purpose circuits such as ASICs (Application Specific Integrated Circuits), a server according to the invention also covers embodiments of the second server 3-2 where some or all of the units are implemented as separate computer programs or computer program modules running on a processor. Such an embodiment is disclosed in conjunction with FIG. 11.

Figure 11:
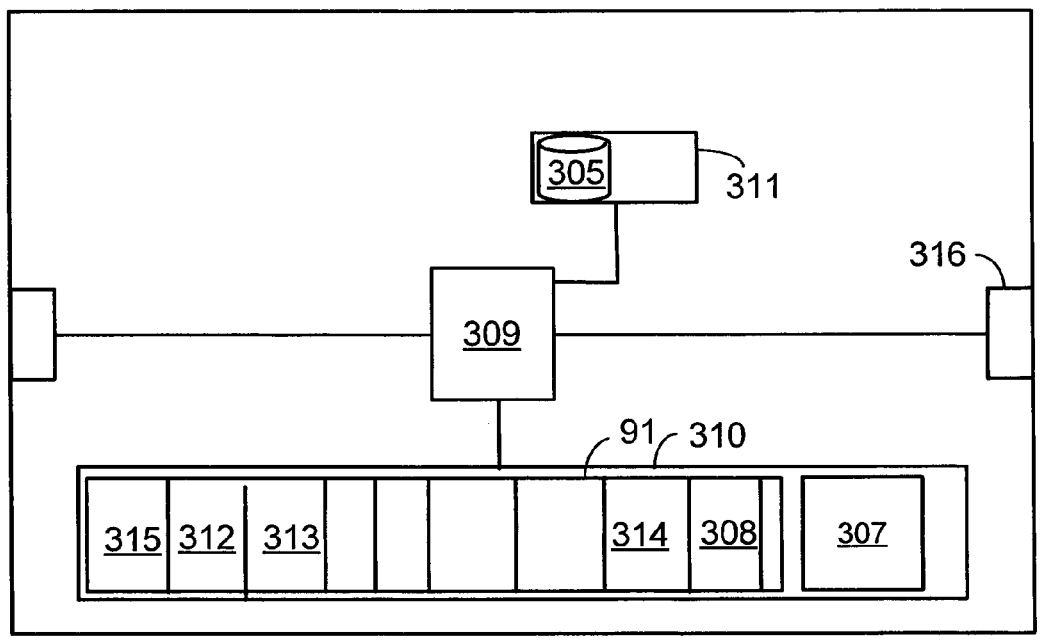

The matching unit 302 may be enabled by the matching engine computer program 307 or a computer program module 308 of a recommender engine computer program 91 in combination with a processor 309, e.g. one or more microprocessors with or without DSP:s (Digital Signal Processors). The recommender engine computer program 91 and the matching engine computer program 307 are here stored in a first computer program product 310 in the form of a computer readable medium such as a harddisk, flash memory, disc, ROM (Read-only memory), RAM (Random Access Memory), and EEPROM (Electrically Erasable Programmable Read-only Memory). The database 305 for location profiles is illustrated as comprised in a second computer program product 311 in the form of a memory, e.g. in the server. The database 305 may however of course also be comprised in the first computer program product 310. As illustrated in FIG. 11, the processor 309, the first computer program product 310 and the second computer program product 311 are connected with each other via a system bus. The receiving unit 301, the sending unit 303, the retrieving unit 304 and the weighting unit 306 are here enabled by corresponding computer program modules 312, 313, 314 and 315 respectively of the recommender engine computer program 91 when run by the processor 309. To physically enable the sending and receiving of information from and to the second server 3-2, the receiving unit 301 and the sending unit 303 of course has to be supported by hardware parts known to the skilled person, such as physical ports 316 for wired connection with e.g. the first server 3-1 or a transceiver circuit for wireless communication (not shown).

Figure 12:
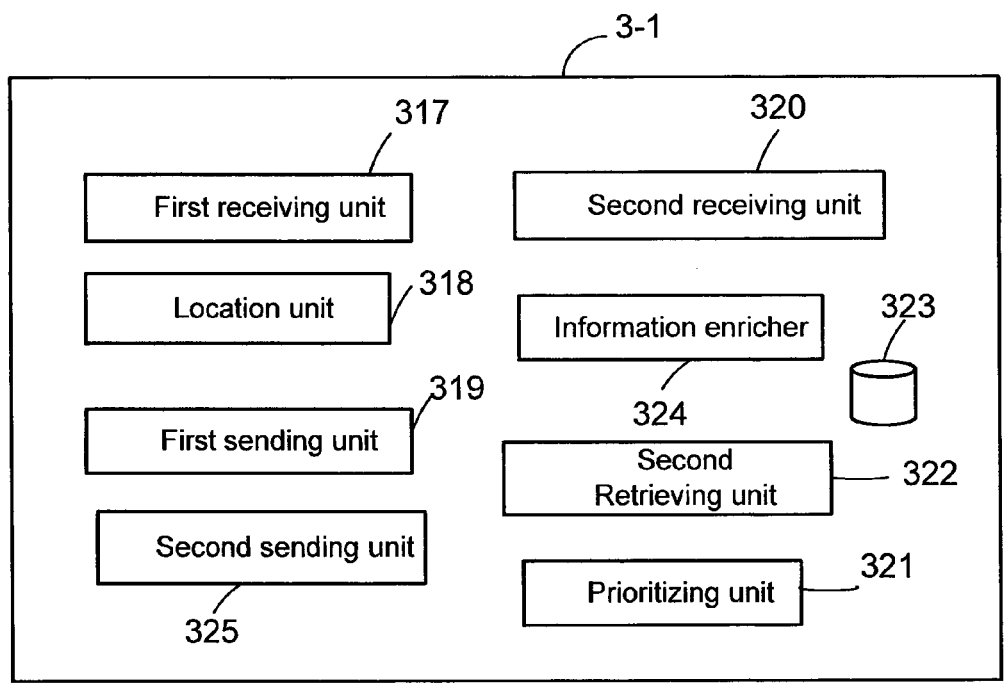

FIG. 12 schematically shows units comprised in an embodiment of the first server 3-1. As should be apparent from the above description of different embodiments of the recommender system 3, the first server 3-1 may comprise the following functional units:
- a first receiving unit 317 for receiving the recommendation request 2,
- a location unit 318 for determining the location-id of the location $1_r$.,
- a first sending unit 319 for sending the recommendation request 2 or a modified recommendation request 2 to the second server 3-2,
- a second receiving unit 320 for receiving information associated with recommended items from the second server 3-2,
- a prioritizing unit 321 for optional, further prioritization of items to be sent to the user device 1,
- a second retrieving unit 322 for retrieving meta data from a meta data database 323,
- an information enricher 324 for enriching the information associated with the recommended items with meta data, links, images etc, and
- a second sending unit 325 for sending the recommendation 5 to the user device 1.

The first receiving unit 317 may also be configured to receive from the user device 1:
- a user identification;
- a geographical position associated with the user identification, suitably within or in conjunction with the recommendation request 2;
- information about at least one consumption of an item and a time of the consumption;
- information about a wireless telecommunications network utilized by the user device 1,
- user password for a service,
- operating system of the user device 1, and
- information on whether a telephone subscription is a post-paid or prepaid subscription.

Figure 13:
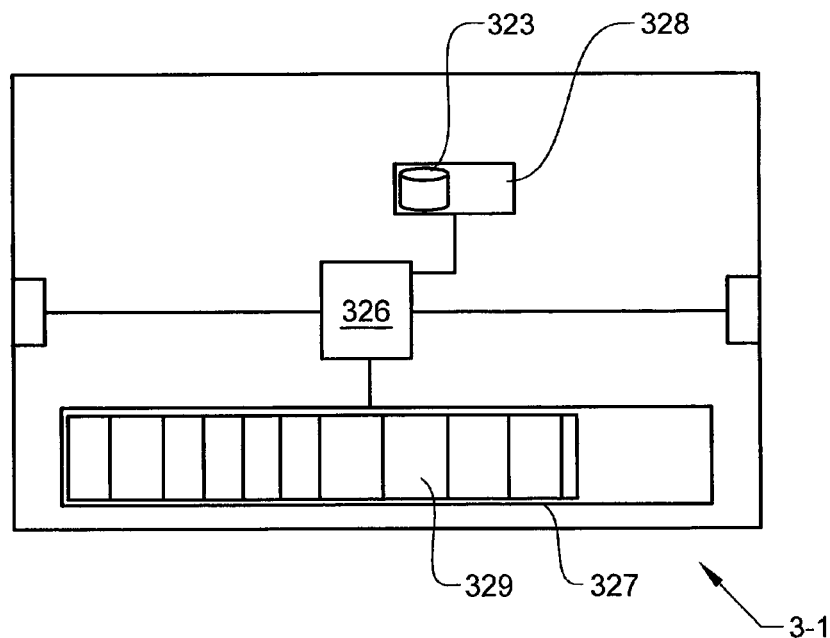

Although the respective units and the information enricher 324 disclosed in conjunction with FIG. 12 have been disclosed as physically separate units in the first server 3-1, and all may be special purpose circuits such as ASICs, the first server 3-1 has embodiments where some or all of the units are implemented as separate computer programs or computer program modules running on a processor. Such an embodiment is disclosed in conjunction with FIG. 13, where the first server 3-1 comprises a second processor 326 connected to a third computer program product 327 and a fourth computer program product 328 connected to each other via a system bus. .The second processor 326 may be one or more microprocessors with or without DSP:s. The third and fourth computer program products are computer readable media such as a harddisk, flash memory, optical disc, ROM, RAM and EEPROM. The meta data database 323 is illustrated as comprised in the fourth computer program product 328, but may in other embodiments be comprised in the third computer program product 327. The information enricher 324, the first receiving unit 317, the location unit 318, a first sending unit 319, a second receiving unit 320, the prioritizing unit 321, the second retrieving unit 322 and the second sending unit 325 are here enabled by corresponding computer program modules respectively of a part of a distributed recommender computer program 329, which when run by the second processor 326 correspond to the respective unit and the information enricher 324. The distributed recommender computer program 329 may when stored in a computer program product, such as a memory provided by a vendor for the recommender computer program 329 also comprise the recommendation engine computer program 91 and/or the matching computer program 307.

Embodiments Specifically Directed to Recommendation of Mobile Applications

The person skilled in the art appreciates that the recommender system 3 and the user device 1 as described above can be implemented in many ways. In order to illustrate this further, exemplary embodiments related to the recommendation of items in the form of mobile phone applications are in the following described in more detail. Here a client-server system comprising the recommender system 3 and the user device 1 is utilizing the Android platform. The server-side of the client-server system is suitably implemented using Java Enterprise Edition.

Figure 14:
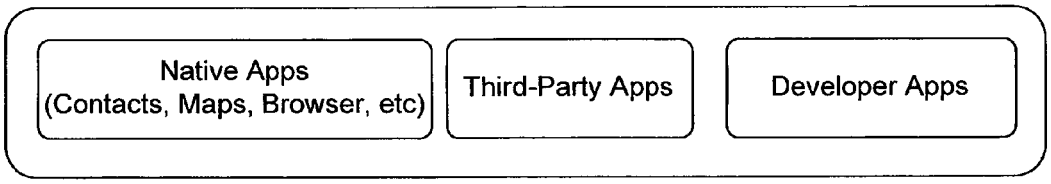
FIG. 14 shows an Android software stack utilized in one embodiment.
Figure 14:
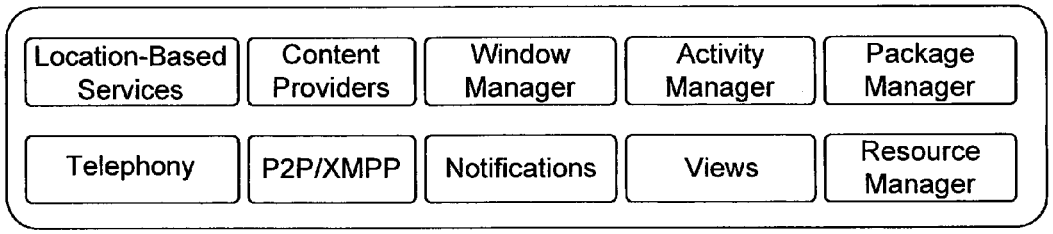
Figure 14:
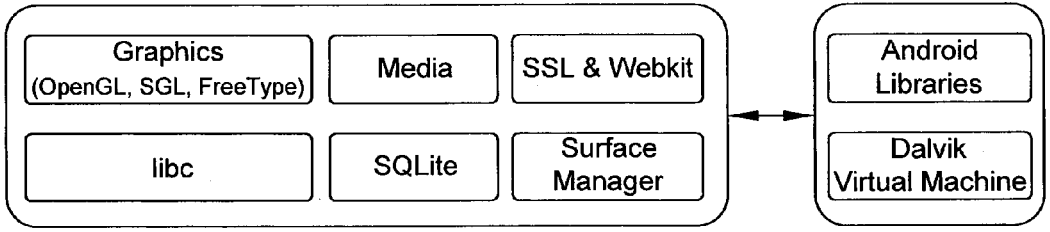
Figure 14:
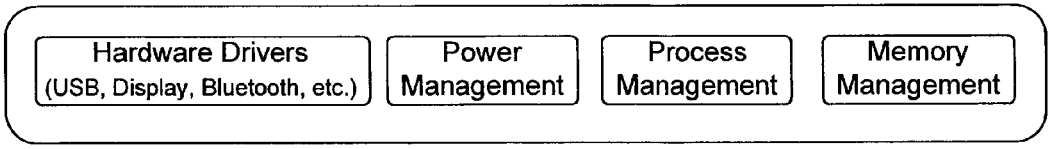

In FIG. 14 the Android software stack is shown. It illustrates that the client application 7 can make use of the application framework for standard GUI components and various managers such as the Activity Manager and Content Providers for storage.

There are four major components to an Android application: Activities, Services, Broadcast Receivers and Content Providers. An Activity presents the GUI and is given the full size of the display to draw in. The Activities also handle user touch input. A Service does not have a user interface, but is run in the background, and could for instance be fetching data over the network. A Broadcast Receiver receives and reacts to broadcast announcements sent by an Android system or other applications. Content Providers store and retrieve data to make it available to all applications, and is here the way to share data across applications. Content Providers here also handle data storage within an application and SQLite is the database used by the Content Providers. In this embodiment, the user device 1 is responsible for collecting and sending consumption data/information to the recommender system 3. The user device 1 makes the recommendation requests 2 to the recommender system 3 and displays the received recommendations to the user 8. The recommender system 3 collects application metadata, stores consumption data received from user devices, and forwards requests for recommendations to a recommender engine such as the recommender engine 9 illustrated in FIG. 3, and then sends the recommendation 5 back to the user device 1.

A motivation for this design is that although the user device 1 could make requests directly to the recommender engine 9 it would have to store lots of data, such as consumption data and application metadata. The user device 1 could possibly even comprise parts or even all of the principal functionality of the recommender system 3. However, the computational power and storage capabilities of user devices such as mobile devices are currently relatively limited if compared to typical server hardware. There is also a convenience in having a centralized way of collecting application metadata. The task of collecting and managing applications does not need to become a distributed problem, and the recommender engine can remain unchanged, as it is not part of the collecting. This solution also allows modifications to parts of the recommender system 3, without a need for the client application 7 to be updated.

Figure 15:
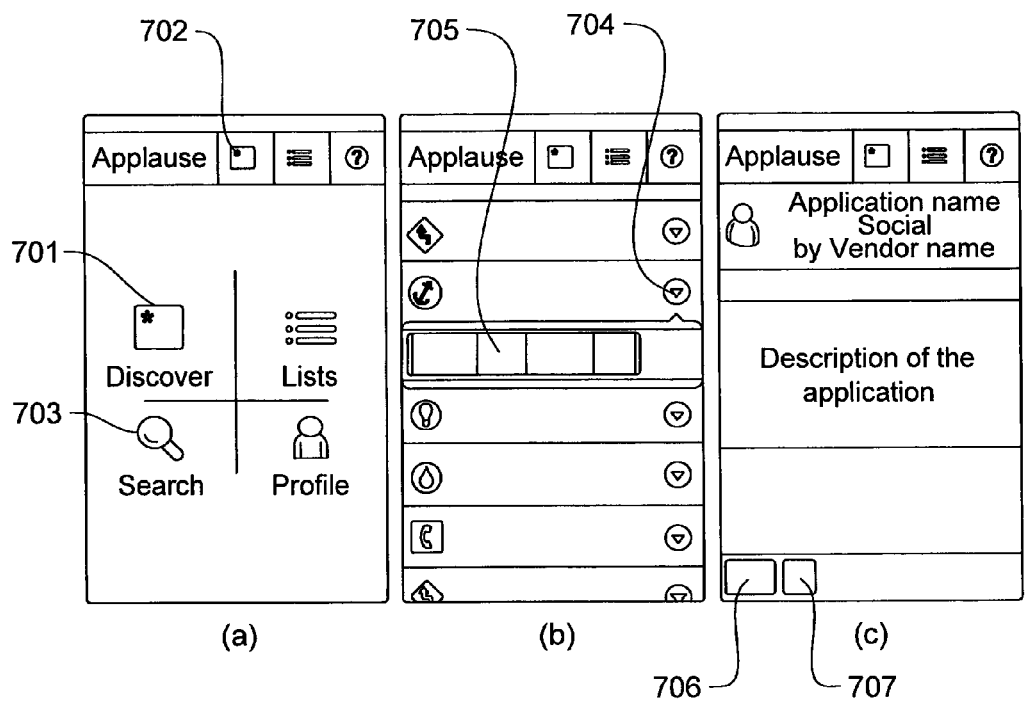
FIG. 15 shows three GUI (Graphical User Interface) screens of a client application.

To describe the client application 7 adapted for communication with the recommender system 3, a task-based and top-down approach is taken. A typical user scenario is shown in FIG. 15, where the user 7 is first shown a home screen (a) of the application. If the user 7 then presses "Discover", a list of recommendations is shown in screen (b), and from the list of recommendations the user may view an application's details in screen (c) by pressing an item in the list, or display a pop-up menu with available actions as illustrated with screen (b).

Figure 16:
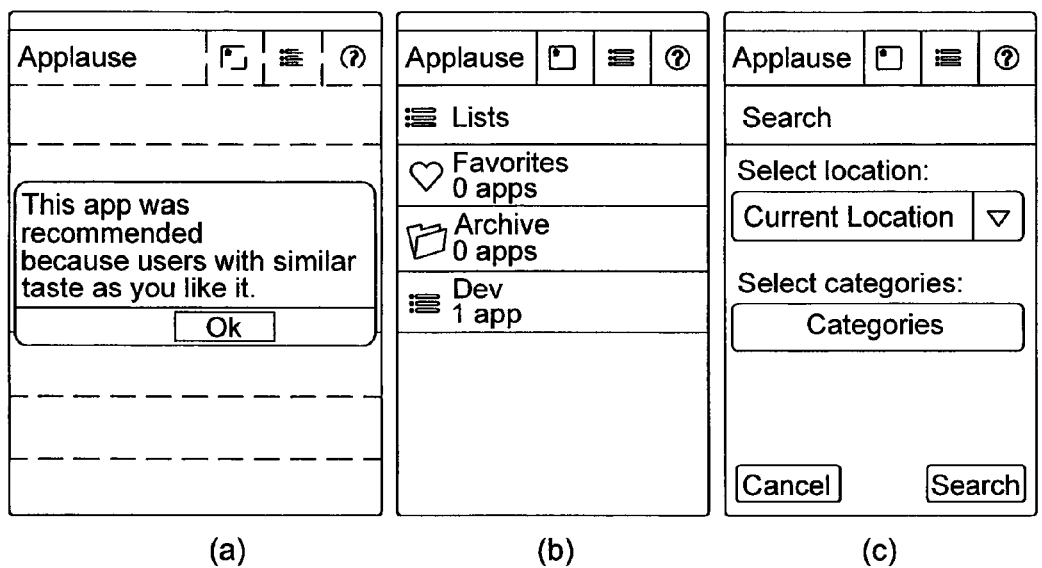
FIG. 16 shows three other GUI screens of a client application.
Figure 17:
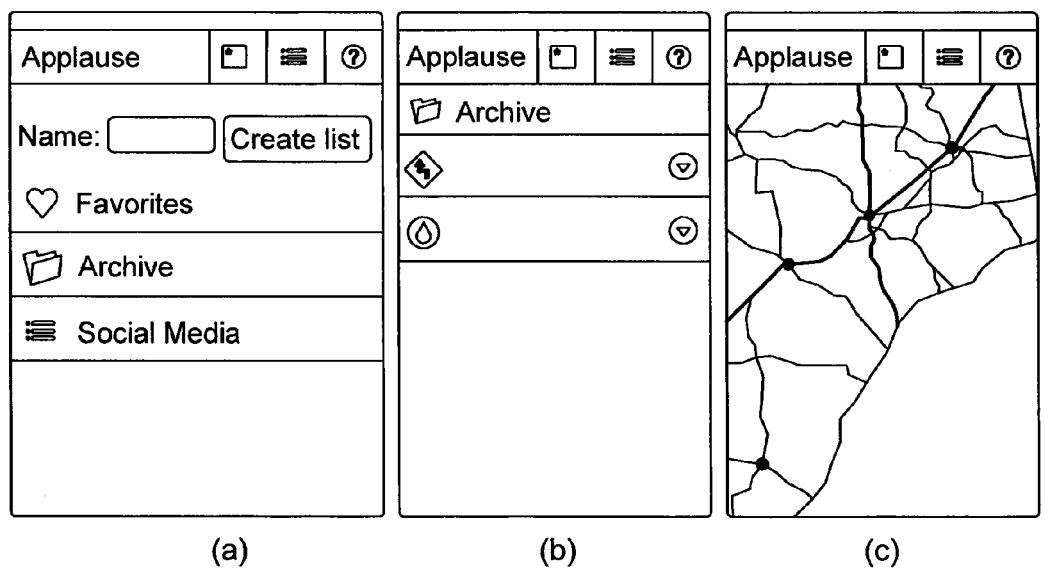
FIG. 17 shows three other GUI screens of a client application.

Other features of the client application are illustrated in FIGS. 16 and 17. As recommendations are presented and applications are run on the same system as the client application 7, it is possible to monitor the user's actions. Access to contextual information such as the time and the user's location is also made available through the Android platform and this information can therefore be associated with each consumption.

Table 1 above shows exemplary types of consumptions that can be collected according to this embodiment. If an application is 'consumed', it is run on the user device 1 in the foreground. A consumption of the type 'save' means that the user chose to install the application, and the opposite of this is 'delete' which corresponds to an application being uninstalled. A 'glimpsed' application has been recommended and shown to the user, whereas 'associate' only means that application information has been sent to the user device 1 as a recommendation. Hence, 'glimpsed' is a subset of 'associate'. If a user views the details of an application, it is stored as a consumption of type 'consider'. Users are enabled to place applications in lists within the client application and such an action is referred to as a 'mark' and a request for similar applications for an application is of the type 'query'.

A consumption is made up of the user's id, the application's id, the context in which the consumption took place and the type of the consumption. The context here comprises at least information on the time and location associated with each consumption. The context could be extended to comprise any other information describing the context, such as battery status, sensory data, network connection and other applications running Some of the consumptions, namely glimpse, consider, mark, associate and query, are logged from the Activities (e.g. the displaying of the screens illustrated in FIGS. 16 and 17) of the client application. The remaining consumption types are logged in a Broadcast Receiver which listens for broadcasts sent by the Android system, notifying its listeners of events. Each time a consumption is detected, it is stored in an SQLite database.

As the consumptions are stored locally in the user device 1 rather than sent to the recommender system 3 instantly after their creation, they can be retrieved from the SQLite database and sent at any time. This allows for freedom to modify when consumptions should be sent. It could be done according to one or more of the following events: upon request from the user 8, when a recommendation request 2 is made by the user device 1, timer-based (e.g. at regular intervals or at a certain time after a consumption has been made), as soon as the user has Wi-Fi access, when the client application 7 is launched in the user device 1 and when the number of consumptions stored in the SQLite database reaches a certain number, to avoid them taking up too much memory space. The recommender system 3 has a REST (Representational state transfer) interface which accepts json-string representations of consumptions. The stored consumptions in the user device 1 are converted to such strings with the use of Gson, a Java-library for converting Java objects into their json representation. A list of such strings is sent to the recommender system 3 using the org.apache.http library, which is part of the Android platform. The recommendation request 2 thus comprises information about the location of the request, the user's id, categories and optionally also a Boolean indicating whether the recommendations should be based only on location or not. To save memory space, consumptions are deleted once they have been sent to the recommender system 3, but they are not deleted until the recommender system 3 has responded that the consumptions have been stored in the recommender system 3.

Requesting recommendations can be performed in two ways in the client application 7, the user can either make a general request or use the search functionality to specify some criteria for the request. This selection is done on the home screen, (see FIG. 15(*a*)) of the client application 7, where pressing a first Discover icon 701 results in a general recommendation request. Discovery can also be reached by pressing a second discovery-icon 702 in a menu-bar at the top of the client application GUI. A button Search 702 initiate the displaying of a search interface shown in 16(*c*).

From the search activity, the user 8 is enabled to specify a location on which the recommendations 5 should be based. To select a location, the user 8 is shown a zoomable and movable map as illustrated in FIG. 17(*c*), and by clicking/touching a spot on the displayed map for more than a predetermined time, for example one second, makes the location selected. This could for instance be useful in case the user 8 is going on vacation and wishes to download applications relevant to the destination before the trip is made. It could also serve as inspiration to know which applications are popular in a certain region such as New York or at the NASA headquarters. From the search activity, the user 8 may also select application categories which make only applications from these categories valid for recommendation.

The response, i.e. the recommendation 5, from the recommender system 3 to the recommendation request 2 is here a list of applications, in the json format, which is transformed into a Java list of Application objects using Gson. The presentation of the recommended items is the same for the two types of requests described above and is illustrated in 15(*b*). A scrollable list is displayed to present the recommended applications and comprises information such as icon, title and category for each recommended application in the list. By pressing an arrow 704 presented to the right of each list item reveals a pop-up menu 705 with four buttons. One of the buttons gives, if pressed, the possibility to install the application. The other buttons gives the possibility to place it in a list, request displaying of similar applications and get an explanation as to why the application has been recommended, respectively. The applications may typically be ordered according to a rank provided by the recommender system 3. Each application may, even if not shown in the Figs., have an attribute indicating the applications position, where '1' is the most relevant and should be displayed first in the list, '2' is the second most important and so on.

Received recommendations of applications are here cached on the user device 1 until the next recommendation request 2 is made, whereupon the cached recommendations are removed to save storage space and give way to new recommendations. The recommendations are cached to allow the user 8 to accept, e.g. a phone call, without risking that the recommendations disappear.

By pressing a displayed area associated with a listed item itself, details such as the name of the application, the category of the application, the vendor of the application, version number, average ratings by users, indication of the number of downloads, and a description of the application (as shown in 15(c)) of the recommended application are shown and the user 8 may take actions such as installing the application, by pushing on an Install button 706 or, by pushing a 'List' button 707 placing it in another list which is stored on a more permanent basis in the user device 1 than in the cache. This list can of course be stored in an embedded memory in the user device 1, but may of course also be stored in a detachable memory card/flash card. If the user 8 decides to install the application, it is in this embodiment typically launched in an Android market client installed on the user device 1 where the user needs to confirm the installation before the application is downloaded, but it may of course be downloaded from a server not connected to the Android market service. Application-lists re as indicated in FIG. 16(b) a feature in the client application 7 and enables the user 8 to archive or manage recommended applications. A recommendation of an application may be placed in a list for inspection at a later time, if the user for instance wants to wait until there is Wi-Fi access or connection to a home telecommunications network, before downloading the application. Lists also allow the user 8 to group applications, for application management purposes. An optional feature of the client application 7 is to enable users to install or uninstall all of the applications in a list in one click. Two lists are in one version of the client application 7 included already from start: in FIG. 16(b) called 'Favorites' and 'Archive'. When placing a recommended application (or rather information associated with a recommended application) in a list, the user 8 may however create other lists. This is shown in 17(a) where the user may select an existing list or create a new one. By selecting "Lists" from the home screen the user 7 is shown the available lists, and pressing one of the lists shows the applications placed in this list as shown in 17(b) where the contents of the Archive list is displayed.

A top-down approach will now be used to describe the inner workings of the recommender system 3 associated with above client application. The recommender system 3 is here embodied as a single server. As should be apparent from the above description, the server is configured to receive and store consumption data, receive a recommendations request from the user device 1 and respond to this request by deriving recommendations. To provide this functionality the server is also able to collect meta data for applications.

Figure 18:
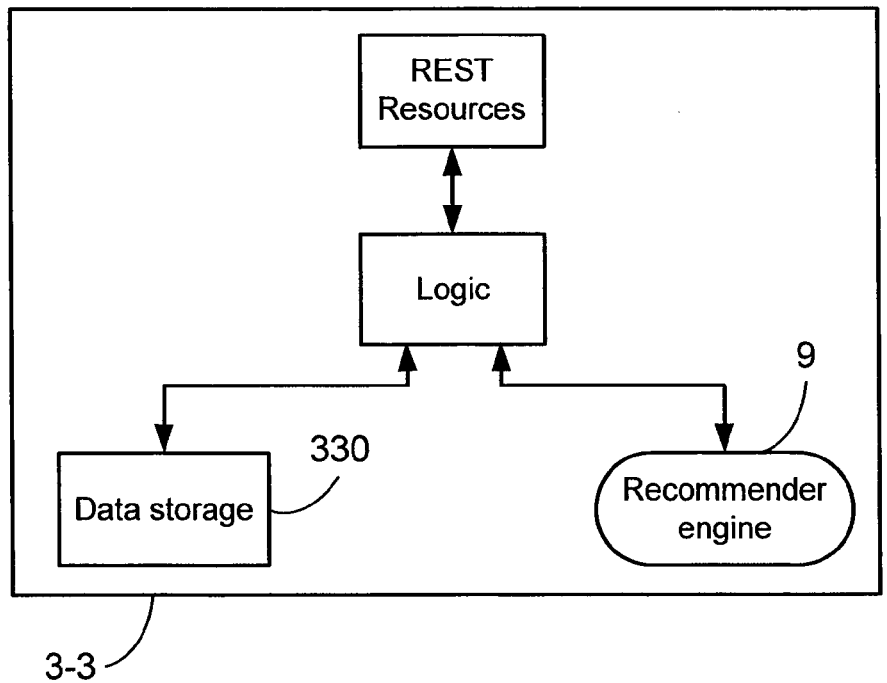
FIG. 18 shows conceptual layers of a server according to an embodiment of a recommender system.

As seen in FIG. 18, REST resources are at the top layer of the server where they serve as an interface to the underlying functionality. Each request made to the server is handled by the REST resources and forwarded to the appropriate part of the logics layer. Each resource presents an interface to an entity such as application, recommendation, consumption or user-id. A recommendation request 2 to the server is here made through an HTTP request and results in a call to the appropriate method of the class representing and implementing the resource. When the recommendation request 2 has been processed by the logics layer, the REST layer creates a response/recommendation 5 which is sent to the requesting user device 1. This response is either empty with a status code indicating whether the recommendation request 2 was successful or not, or contains a message representing the requested resource. For instance, a request for recommended applications returns a list of applications as a json-string.

Once requests to the server have been interpreted and any additional data parsed by the REST layer, the request is passed to the logics layer which takes an appropriate action, which here is, inter alia, to store the consumptions in a database 330, which correspond to the location profile database 305 in the second server 3-2 above, had the recommender system 3 in this specific embodiment been a two-server system.

The recommendation request 2 is also passed on to the recommender engine 9 either directly or via a recommender engine adapter (not shown). The logic layer makes sure to instantiate any objects needed by the underlying layers and passes them to appropriate methods.

Figure 19:
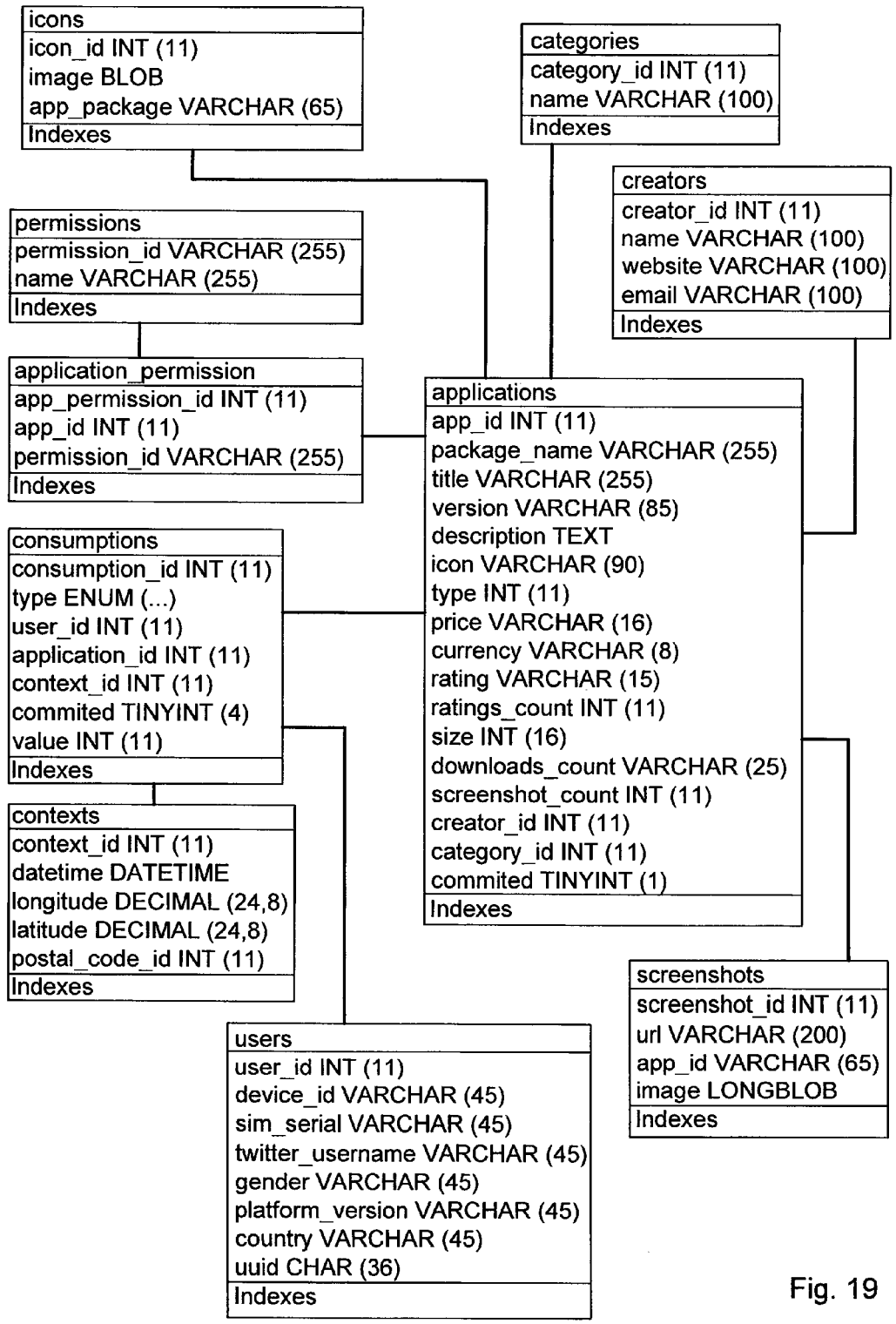
FIG. 19 illustrates a database of an embodiment of a recommender system.

Data persistence is handled using Hibernate which is a persistence framework for Java EE. Through an Object/ Relational mapping, Java objects are fetched and stored. A mapping file may be used for each item/entity defining the mapping from Java object to a relational database representation of each entity. A configuration file defining which database to use and authentication information for this database is defined and used by Hibernate to connect to the database. The meta data database may here be a MySQL database and an illustration of such a database is made in FIG. 19. Each of the entities in this model has a corresponding Java class which it maps to. Using Hibernate and MySQL allowed for a rapid implementation of the persistence functionality.

For the server to be able to send application recommendations with metadata such as title, version and so on to the user device 1 in an efficient way, this information is in this embodiment stored in the server, but may of course in other embodiments be stored in another server, even outside the recommender system 3. As the Android platform is used in this example, android application metadata should be collected, e.g. using an existing API to the Android Market. The collection of metadata is here instantiated by an administrator of the recommender system 3 through an HTTP request, which could be performed from any browser or other HTTP client. Table 2 lists admin requests and their meaning

TABLE 2

Meta data admin requests

| Admin Request | Meaning |
|---|---|
| Collect Random | The server fetches application meta data and random |
| Collect New | The server fetches application meta data for applications marked as new in the Android Market |
| Collect Featured | The server fetches application meta data for applications marked as featured in the Android Market |
| Collect Popular | The server fetches application meta data for applications marked as popular in the Android Market |
| Maintain | The server identifies applications with missing metadata in the database, and fetches metadata for these applications |

For applications which have been consumed on the user device 1, corresponding identifying strings will be sent to the server as explained above. If a consumed application is not already present in the meta data database, its identifying string will be stored but the other metadata fields are left blank. The maintain request of table 3 can be used to populate the metadata of such applications in the recommender system 3. The meta data database corresponds to the meta data database 323 in the first server 3-1 in the two-server configuration of FIG. 2.

As is readily understood from the description above, the client application 7 comprises code means which when run on the user device 1 enables the user device 1 to:
- send the recommendation request 2 to the recommender system 3,
- receive the recommendation 5,
- display the recommendation 5 on a screen of the user device 1,
- store information about at least one consumption of an item, such as a mobile application, indicated in the user device 1, and
- send the information about the at least one consumption to the recommender system 3.

The invention claimed is:

1. A server for supporting a recommendation to a user device, comprising a matching unit configured to match a first location profile associated with a current location of the user device with at least one other location profile, wherein the matching is based on at least one item consumed in the current location in a first time interval and at least one item consumed in the other location in at least one second time interval which is different from the first time interval, wherein the current location and the other location have similar and time-shifted consumption patter, wherein the matching is determined by dividing consumptions for the current location and the other location into time segments and obtaining co-rated pairs of the current location and the other location with similar consumption pattern.

2. The server according to claim 1, wherein the first time interval ends after the end of the second time interval.

3. The server according to claim 1, wherein the first time interval begins after the beginning of the second time interval.

4. The server according to claim 1, wherein the first time interval has occurred later than the second time interval.

5. The server according to claim 1, wherein the matching unit is configured to perform the matching by comparing hashed consumption information of the first location profile with hashed consumption information of the other location profile.

6. The server according to claim 1, wherein the matching unit is configured to perform the matching partly by calculating a similarity between items.

7. The server according to claim 6, wherein the matching unit is configured to calculate the similarity using a Pearson-r correlation.

8. The server according to claim 1, comprising a weighting unit for basing the recommendation also on a weighted prioritization between items associated with the first location profile and items of the other location profile.

9. The server according to claim 1, comprising a sending unit for sending the recommendation, wherein the recommendation comprises information about items retrieved both from the first location profile and from the other location profile.

10. The server according to claim 1, wherein the matching unit is a part of a recommender engine.

11. The server according to claim 1, comprising a retrieving unit and a database, which comprises a first set of items associated with the first location profile and a second set of items associated with the other location profile, and wherein the retrieving unit is configured to retrieve the first set of items and the second set of items.

12. The server according to claim 11, wherein the first set of items and the second set of items are retrievable from a table of the database, where the table comprises records where each record comprises location identity, item identity, time of consumption and consumption type.

13. The server according to claim 1, comprising an information enricher for retrieving from a meta data database further information associated with items recommended in the recommendation.

14. The server according to claim 1, comprising the meta data database.

15. The server according to claim 1, comprising a receiving unit configured to receive from the user device a user identification and a geographical position associated with the user identification.

16. The server according to claim 15, wherein the user identification is one or more of user device identity, IMSI, mobile network subscription identity, and authentication data.

17. The server according to claim 15, wherein the receiving unit also is adapted to receive from the user device information about at least one consumption of an item and a time of the consumption.

18. The server according to claim 15, wherein the receiving unit is configured to receive from the user device information about a wireless telecommunications network utilized by the user device, user password for a service, operating system of the user device, and information on whether the subscription is a post-paid or prepaid subscription.

19. A recommender system comprising a first server and a second server, wherein the first server comprises a sending unit for sending a recommendation of at least one item to a user device, and the second server comprises a matching unit configured to match a first location profile associated with a current location of the user device with at least one other location profile, wherein the matching is based on at least one item consumed in the current location in a first time interval and at least one item consumed in the other location in at least one second time interval which is different from the first time interval, wherein the current location and the other location have similar and time-shifted consumption pattern, wherein the matching is determined by dividing consumptions for the current location and the other location into time segments and obtaining co-rated pairs of the current location and the other location with similar consumption pattern.

20. The recommender system according to claim 19, wherein the second server comprises a weighting unit for basing the recommendation also on a weighted prioritization between items associated with the first location profile and items of the other location profile.

21. The recommender system according to claim 19, wherein the second server comprises a retrieving unit and a database, which comprises a first set of items associated with the first location profile and a second set of items associated with the other location profile, and wherein the retrieving unit is configured to retrieve the first set of items and the second set of items.

22. The recommender system according to claim 19, wherein the first server comprises an information enricher for retrieving from a meta data database further information associated with items recommended in the recommendation.

23. A computer program product comprising a computer readable medium storing a recommender engine computer program comprising computer readable code which when run on a server of a recommender system causes the server to match a first location profile associated with a current location of the user device with at least one other location profile, wherein the matching is based on at least one item consumed in the current location in a first time interval and at least one item consumed in the other location in at least one second time interval which is different from the first time interval, wherein the current location and the other location have similar and time-shifted consumption pattern, wherein the matching is determined by dividing consumptions for the current location and the other location into time segments and obtaining co-rated pairs of the current location and the other location with similar consumption pattern.

24. The computer program product according to claim 23, wherein the computer program further comprises computer readable code which when run on the server causes the server to perform the matching by comparing hashed consumption information of the first location profile with hashed consumption information of the second location profile.

25. The computer program product according to claim 23, wherein the current location and the other location have similar and time-shifted consumption pattern, wherein the computer program further comprises computer readable code which when run on the server causes the server to perform the matching partly by calculating a similarity between items.

26. The computer program product according to claim 23, wherein the computer program further comprises computer readable code which when run on the server causes the server to retrieve from a database a first set of items associated with the first location profile and a second set of items associated with the other location profile.

\* \* \* \* \*